Dec. 1, 1936. C. A. A. G. SABAEFF 2,062,831
BICYCLE ATTACHMENT FOR EXERCISING
Filed Sept. 6, 1935 2 Sheets-Sheet 1
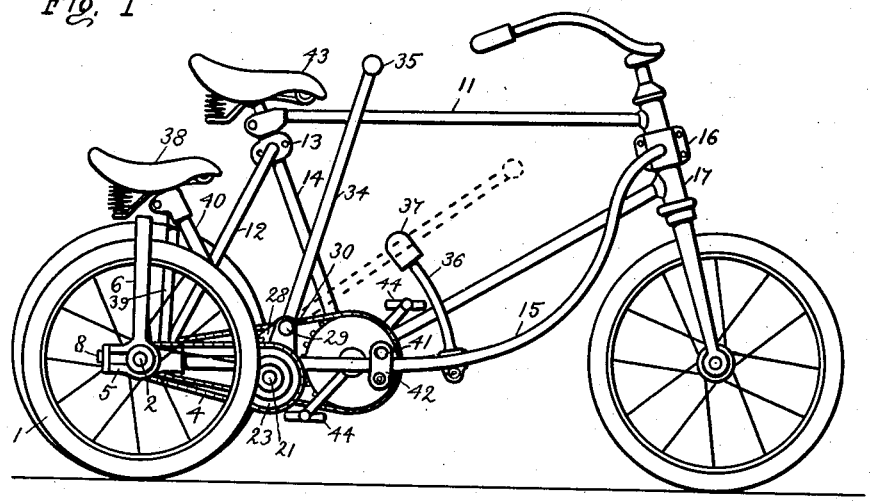
Fig. 1
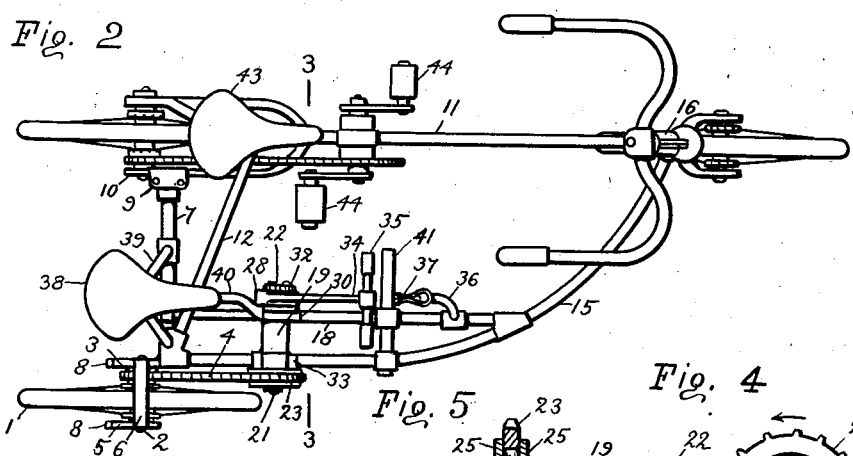
Fig. 2
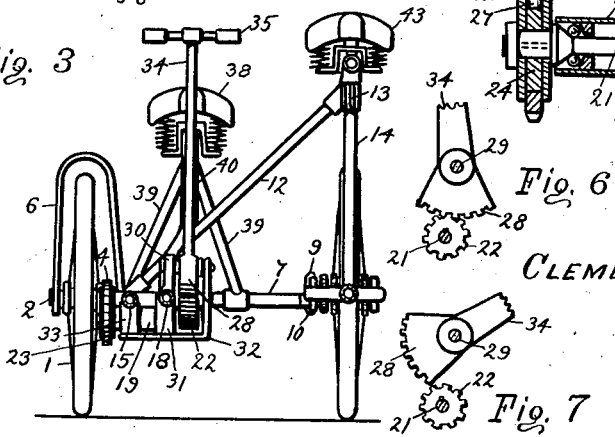
Fig. 3
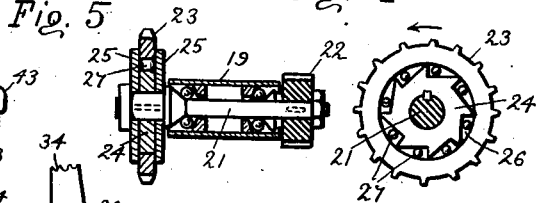
Fig. 4
Fig. 5
Fig. 6
Fig. 7
CLEMENT A. A. SABAEFF
INVENTOR
BY John P. Nironow
ATTORNEY Dec. 1, 1936.  C. A. A. G. SABAEFF  2,062,831
BICYCLE ATTACHMENT FOR EXERCISING
Filed Sept. 6, 1935  2 Sheets-Sheet 2
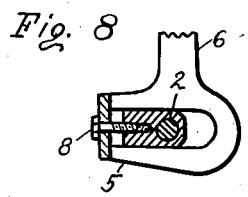
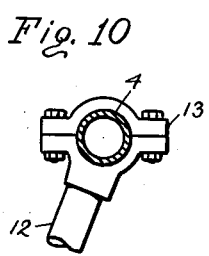
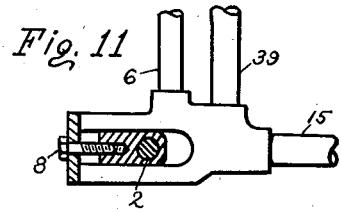
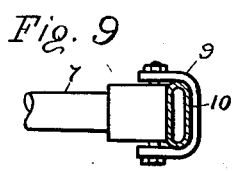
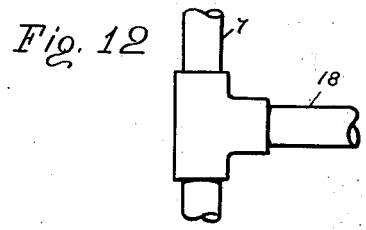
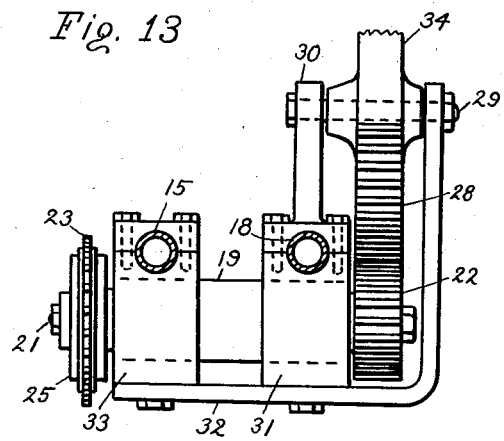
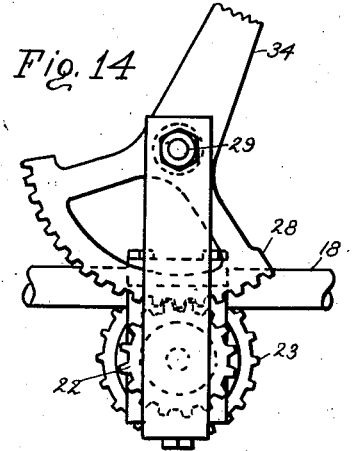
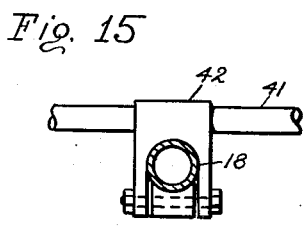
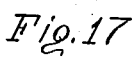
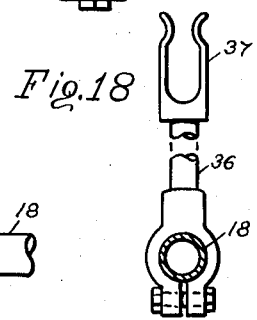
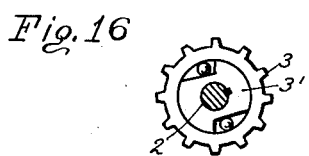
CLEMENT A.A.G. SABAEFF
INVENTOR
BY John P. Nikonov
ATTORNEY Patented Dec. 1, 1936

2,062,831

UNITED STATES PATENT OFFICE 2,062,831

BICYCLE ATTACHMENT FOR EXERCISING

Clément A. A. G. Sabaeff, New York, N. Y.

Application September 6, 1935, Serial No. 39,402

6 Claims. (Cl. 208—45)

My invention relates to bicycle attachments for exercising and has particular reference to attachments representing an open side car with a manual propelling mechanism.

My invention has for its object to provide an extra wheel and a seat in a frame forming an open side car adapted to be detachably connected to an ordinary bicycle. For this purpose the ends of the side frame are provided with clamps suitable for attaching them to the frame members of a bicycle.

Another object of my invention is to provide an open side car with a mechanism for driving its wheel by a reciprocating lever. For this purpose the reciprocating lever is provided with a geared or toothed segment in mesh with a pinion on a driving shaft, the latter having a sprocket for a chain engaging a sprocket on the wheel of the side car. The lever is pivotally mounted on the frame within convenient reach of the side car passenger. A foot rest is also provided for the latter. A free wheeling clutch is fitted in one of the sprockets in order to transmit the power from the lever to the wheel in one direction only while the lever is being reciprocated.

Another object of my invention is to provide means for disengaging the reciprocating lever from the driving mechanism when it is desired to roll the bicycle backward.

Another object of my invention is to provide a manual driving mechanism of such type that it will not only help to propel the bicycle, but will also serve as an efficient exercising device for the body muscles, especially arms, shoulders and chest. In this respect my mechanism is similar to rowing machines, as well as to actual rowing, having an added advantage that the exercising is combined with a ride in open air.

A rider on the side seat, while exercising the muscles of the upper portion of his body, keeps his feet on a foot rest and does not use his leg muscles. In this respect my attachment represents a counterpart to the standard bicycle to which the side car is attached, the rider of the bicycle exercising his leg muscles only. My attachment therefore, in combination with an ordinary bicycle, forms an ideal touring conveyance for two persons, who may exchange their seats from time to time, being enabled thereby uniformly to exercise their bodies, resting one set of muscles while the other is being used, and travelling through the country all the while. In this manner the two persons can cover a large mileage without any excessive fatigue.

These and other novel features of my invention are more fully explained and described in the accompanying specification and drawings in which—

Fig. 1 is a side elevation of a bicycle with my attachment, Fig. 2 is a top plan view of the same, Fig. 3 is a sectional view taken on the line 3—3 of Fig. 2, Fig. 4 is a detail view of a free-wheeling or overrunning clutch, Fig. 5 is a sectional detail view of the driving shaft, Fig. 6 is a fractional detail view of the geared reciprocating mechanism in the operating position, Fig. 7 is a similar view of this mechanism with the gear segment disconnected from the pinion, Fig. 8 is a detail view of the mounting of a wheel shaft, Fig. 9 is a detail view of a clamp joining parts of the frame, Fig. 10 is a detail view of another clamp, Fig. 11 is a detail view of a wheel shaft mounting, Fig. 12 is a detail view of a joint between parts of the frame, Fig. 13 is a detail view of a driving shaft mounting, Fig. 14 is another view of the same, Fig. 15 is a detail view of a foot rest, Fig. 16 is a detail view of an overrunning clutch, and Figs. 17 and 18 are detail views of the mounting of a rest bracket for an operating arm.

My bicycle attachment consists of a wheel 1 of an ordinary bicycle type on a shaft 2 with a sprocket 3 engaged by a driving chain 4. The shaft is slidably mounted in the end forks of a yoke attached to a rear frame member 7. The forks 5 of the yoke 6 have screws 8 for tightening the chain.

The rear frame member 7 has a clamp 9 on its end by which it is detachably connected to a fork 10 of an ordinary bicycle 11. A member 12 extends from the outer end of the member 7 and has a clamp 13 by which it is attached to the upper portion of a central post 14 of the bicycle. A side frame member 15 extends from the outer or fork end of the member 7 and is provided with a clamp 16 attached to a front tubular post 17 of the bicycle. A horizontal tubular member 18 is attached at its ends to the members 7 and 15 and with the lower portion of the frame member 15 forms a horizontal frame on which a tubular bearing 19 is mounted. This bearing is shown mounted on the under side of the frame although, of course, it can be mounted on the upper side as well. A driving shaft 21 is journaled in the bearing 19 and has a pinion 22 on one end and a sprocket 23 on the other. The pinion is keyed on the shaft, but the sprocket turns freely on the inner hub 24 between guiding washers 25. The hub has tapering recesses 26 for rollers (or balls) 27. This device represents a free-wheeling or overrunning clutch permitting the drive from the shaft 21 to be transmitted to the sprocket in one direction only shown with an arrow in Fig. 4. When the shaft is driven in this direction, the rollers become wedged between the tapering sides of the recesses 26 and the inner side of the sprocket ring, thereby transmitting the power to the latter. If the shaft 21 is turned to the right (in a counterclockwise direction as per Fig. 4), then the rollers will be forced by friction into the wider portions of the recesses 26 thereby releasing the sprocket ring. The latter will turn freely permitting the wheel to coast. The wheel sprocket 3 can also be provided with an overrunning clutch 3', as shown in Fig. 16, in which case the sprocket 23 may be of an ordinary rigid type.

The free-wheeling clutch may be of any ordinary suitable construction such, for instance, as is used on ordinary bicycles.

The pinion 22 is in mesh with a toothed sector 28 rotatively supported on a shaft 29 supported at one end in a bracket 30 mounted on the upper portion of a yoke 31 clamping the bearing 19 to the frame member 18, and at the other end supported in a bracket 32 attached to the lower portions of the bearing clamping brackets or yokes 31 and 33. The sector 28 has a long arm 34 extending upward and provided with a double handle 35 for the two hands of a rider. A bracket 36 is mounted on the frame member 18 in its front portion and is provided on its upper end with a spring clamp 37 for the arm 34. The length of this bracket or post is such that when the arm 34 is forced between the spring jaws of the clamp into its enlarged rear portion, the teeth of the sector 28 leave entirely the pinion 22 as shown in Fig. 7. This idling or inoperative position of the arm 34 is used when it is desired to roll the bicycle backward. At the same time, the height of the bracket 36 is such that the handle 35 is out of reach for the rider's hands when the arm 34 is held in the clamp 37. This is necessary in order to prevent the possibility for the rider, at the end of the forward swing of the arm 34, to bring the latter so far as to cause the sector teeth to leave the pinion 22. It should be noted, however, that even should this happen, no difficulties or inconvenience may arise, as the sector will come right back into the mesh on the return stroke.

A seat 38 is provided with the side car rider, supported on angularly arranged braces 39 extending from the member 7, and a front post 40 extending from the member 18. The latter is curved as shown in Fig. 2 so as to bring the seat in line with the arm 34.

A foot rest 41 is provided for the rider, this rest being in the shape of a bar supported in clamps 42 attached to the frame members 15 and 18.

In view of the different method of propulsion employed with the use of the reciprocating arm 34, a different posture is required for the rider as compared with his posture for riding an ordinary bicycle. The seat 38 is therefore set lower than the seat 43 of the bicycle and is placed farther back in order to provide better purchase for the rider's feet against an almost horizontal pull, while the bicycle rider uses largely his weight in operating pedals 44.

Because of the entirely different methods of propulsion, the riders on the seats 43 and 44 exercise different sets of muscles, and on the long rides they may exchange their seats at certain intervals of time thereby alternately resting and exercising different muscles of their bodies.

My attachment therefore affords a very convenient vehicle for pleasure riding, being at the same time a very effective device for exercising and building up the body muscles in general.

I claim as my invention:

1. In a bicycle attachment for exercising, the combination of a frame, a wheel supported in said frame, the open ends of said frame being adapted to be removably attached to the frame members of an ordinary bicycle thereby forming a tricycle, a seat for a rider supported on said frame near said wheel, a foot rest on the lower portion of said frame, a shaft rotatively supported on the lower portion of said frame in a substantially parallel alignment with the shaft of said wheel, a driving connection between said shaft and said wheel, an arm pivotally supported on said frame and adapted to be reciprocated by the hands of said rider, a geared connection between said arm and said shaft, and means to transmit the motive power from said arm to said wheel in one direction only.

2. In a bicycle attachment for exercising, the combination of a frame, a wheel supported in said frame, clamps on said frame adapted to removably connect said frame with an ordinary bicycle thereby forming a tricycle, a seat for a rider supported on said frame, a shaft rotatively supported on the lower portion of said frame in a substantially parallel alignment with the shaft of said wheel, a driving connection between said shaft and said wheel, a pinion on said shaft, a bracket supported on said frame, a toothed sector pivotally supported on said bracket and in mesh with said pinion, an arm extending from said sector and adapted to be reciprocated by said rider's hands, means to impart rotation to said wheel by said reciprocating movement in one direction only, and means to disconnect said arm from said pinion.

3. In a bicycle attachment, the combination of a frame adapted to be removably attached to the side of an ordinary bicycle, a wheel supported in said frame, a seat for a rider supported on said frame, a bearing horizontally supported on the lower portion of said frame in a parallel alignment with the shaft of said wheel, a shaft journaled in said bearing, a driving connection between said shaft and said wheel, a bracket supported on said bearing and on said frame, a pinion on the end of said shaft, a toothed sector pivotally supported on said bracket and in mesh with said pinion, an arm extending from said sector in front of said seat and adapted to be reciprocated by the hands of said rider thereby imparting reciprocating rotary movement to said pinion, means to transmit said pinion movement to said wheel through said geared connection in one direction only, a post on the front portion of said frame, and a resilient clamp on said post adapted to detachably hold said arm when the latter is moved forward beyond its normal operative movements, said sector being adapted to be disconnected from said pinion when said arm is held in said clamp.

4. In a bicycle attachment, the combination of a frame adapted to be removably attached to the side of an ordinary bicycle, a wheel supported in said frame, a seat for a rider supported on said frame between said wheel and said bicycle, a shaft rotatively supported on the lower portion of said frame in parallel alignment with the shaft of said wheel, a sprocket on the outer end of said shaft, a sprocket on said wheel, a driving chain connecting said sprockets, a free-wheeling clutch in one of said sprockets, a pinion on the other end of said shaft, a toothed sector in mesh with said pinion, a bracket on said frame with a pinion supporting said sector, and an arm extending from said sector in line with said seat and adapted to be manually reciprocated by said rider.

5. In a bicycle attachment, the combination of a horizontal frame member detachably connected by one end to the side of a rear wheel fork of a bicycle, a fork on the other end of said member, a wheel, a shaft for said wheel supported in said fork, a side frame member extending from said fork to the front portion of said bicycle and detachably connected thereto, a brace member extending from said fork to the upper rear portion of the frame of said bicycle, a saddle seat supported on said horizontal member at the side of said wheel, a supplementary horizontal member extending from said horizontal member to the middle portion of said side member, a tubular bearing supported on said supplementary and said side member in parallel alignment with said shaft, a driving shaft journaled in said bearing, a sprocket on the outer end of said shaft, a sprocket on said wheel shaft, a chain connecting said sprockets, a free-wheeling clutch in one of said sprockets, a pinion on the inner end of said shaft, a toothed sector in mesh with said pinion, means to support said sector on said bearing and said supplementary and side frame members, and an arm extending from said sector, said arm being adapted to be manually reciprocated.

6. In a bicycle attachment, the combination of a fork, a shaft supported in said fork, a wheel rotatively mounted on said shaft, transverse and longitudinal frame members connecting said fork with the frame of a bicycle, a saddle seat supported on said members at the side of said wheel, a tubular bearing supported on said members in front of said seat, a shaft journaled in said bearing, a sprocket on the outer end of said shaft, a sprocket on said wheel shaft, an endless chain connecting said sprockets, a free-wheeling clutch in one of said sprockets, a pinion on the inner end of said shaft in said bearing, a toothed sector in mesh with said pinion, a shaft rotatively supporting said sector, a bracket with a bearing for one end of said shaft, said bracket being supported on the end of said tubular bearing, a second bracket supporting the other end of said sector shaft, said second bracket being supported on the under side of said frame members, an arm extending from said sector and adapted to be manually reciprocated by the rider in said seat, and means to lock said arm in its extreme forward position, said arm in said extreme forward position being adapted to disconnect said sector from said pinion.

CLÉMENT A. A. G. SABAEFF.